(12) United States Patent
Morinaga et al.

(10) Patent No.: US 10,047,190 B2
(45) Date of Patent: Aug. 14, 2018

(54) EPOXY RESIN, METHOD FOR PRODUCING EPOXY RESIN, CURABLE RESIN COMPOSITION, CURED PRODUCT, FIBER REINFORCED COMPOSITE MATERIAL, AND MOLDED ARTICLE

(71) Applicant: DIC Corporation, Tokyo (JP)

(72) Inventors: Kunihiro Morinaga, Chiba (JP); Makoto Kimura, Chiba (JP); Koji Hayashi, Chiba (JP); Takamitsu Nakamura, Osaka (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/508,483

(22) PCT Filed: Aug. 27, 2015

(86) PCT No.: PCT/JP2015/074204
§ 371 (c)(1),
(2) Date: Mar. 2, 2017

(87) PCT Pub. No.: WO2016/035668
PCT Pub. Date: Mar. 10, 2016

(65) Prior Publication Data
US 2017/0275416 A1 Sep. 28, 2017

(30) Foreign Application Priority Data
Sep. 3, 2014 (JP) .................................. 2014-179064

(51) Int. Cl.
| | | |
|---|---|---|
| *C08G 63/02* | (2006.01) | |
| *C08G 59/60* | (2006.01) | |
| *C08G 59/62* | (2006.01) | |
| *C08G 59/58* | (2006.01) | |
| *C08G 59/32* | (2006.01) | |
| *C08J 5/04* | (2006.01) | |

(52) U.S. Cl.
CPC .......... *C08G 59/60* (2013.01); *C08G 59/3218* (2013.01); *C08G 59/58* (2013.01); *C08G 59/621* (2013.01); *C08J 5/042* (2013.01); *C08J 2363/02* (2013.01)

(58) Field of Classification Search
USPC ........................................ 528/176, 190, 219
See application file for complete search history.

(56) References Cited

FOREIGN PATENT DOCUMENTS

| | | |
|---|---|---|
| FR | 2419301 A1 | 10/1979 |
| JP | S64-90215 A | 4/1989 |
| JP | H07-179566 A | 7/1995 |
| JP | H08-120038 A | 5/1996 |
| JP | H09-31144 A | 2/1997 |
| JP | 2013-087212 A | 5/2013 |

OTHER PUBLICATIONS

Search Report issued in corresponding International Patent Application No. PCT/JP2015/074204, dated Sep. 29, 2015.

*Primary Examiner* — Terressa Boykin
(74) *Attorney, Agent, or Firm* — McDermott Will & Emery LLP

(57) ABSTRACT

Provided are a curable resin composition capable of providing excellent heat resistance and toughness for a cured product, in which these physical properties are less deteriorated even in a case of being exposed to humidity and heat conditions, and a cured product, a fiber reinforced composite material, and a molded article thereof. The curable resin composition includes an epoxy resin and a curing agent, in which the epoxy resin is an epoxy resin obtained by the polyglycidyl-etherification of a phenol novolac resin. The phenol novolac resin contains bisphenol F having different binding sites, and in the bisphenol F components, the content of the [o, p'] conjugate is in a range of 30% to 45% relative to the total of the [o, p'] conjugate+the [o, o'] conjugate+the [p, p'] conjugate in terms of the area ratio according to a liquid chromatography measurement.

13 Claims, 2 Drawing Sheets

[Fig. 1]
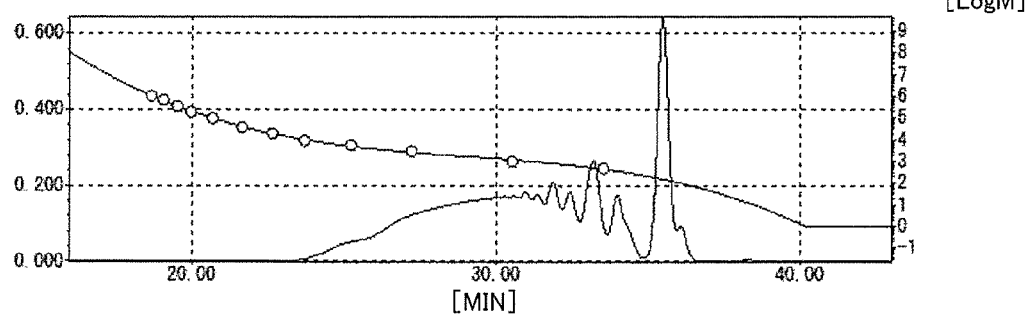
[Fig. 2]
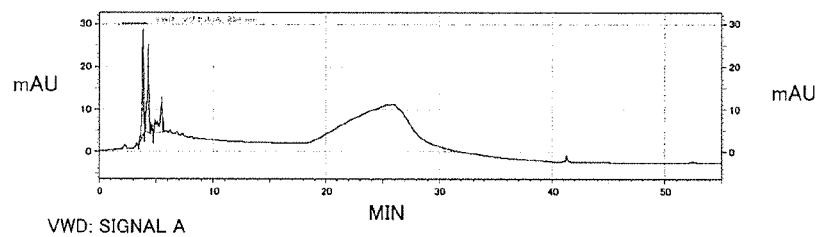
[Fig. 3]
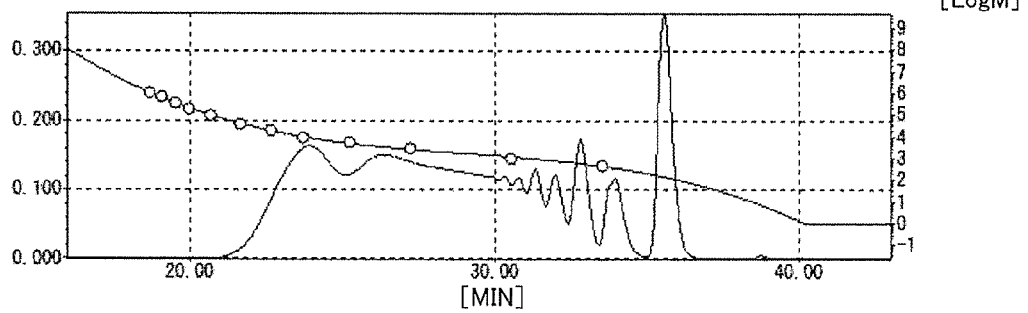

[Fig. 4]
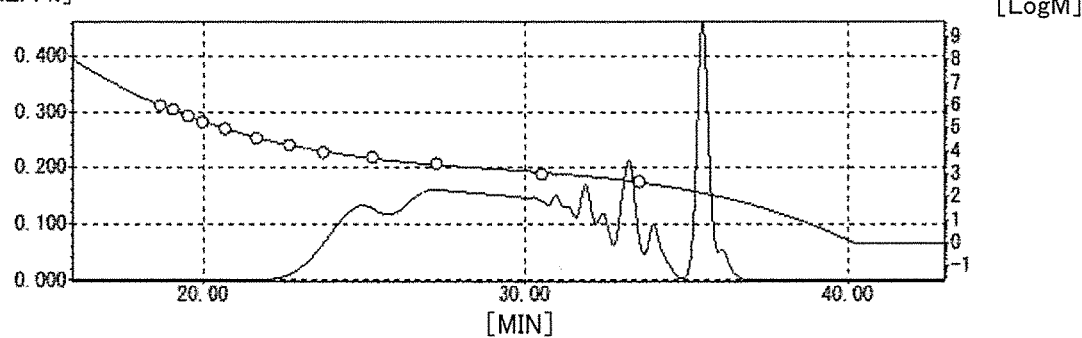
[Fig. 5]
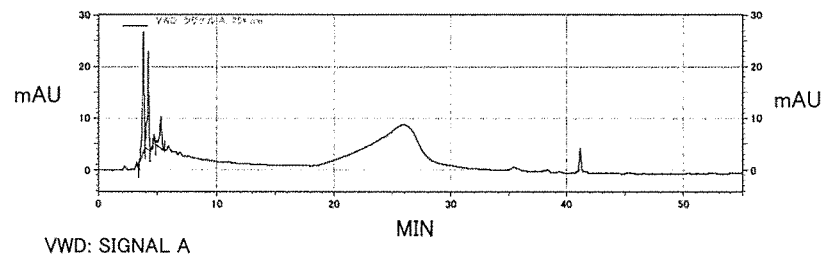
VWD: SIGNAL A
254 nm RESULTS
| RETENTION TIME | AREA | AREA % | HEIGHT | HEIGHT % |
| --- | --- | --- | --- | --- |
| 3.783 | 3320991 | 41.353 | 392973 | 47.346 |
| 4.210 | 3183897 | 39.645 | 320799 | 38.651 |
| 4.490 | 67889 | 0.845 | 11803 | 1.422 |
| 5.293 | 1458140 | 18.157 | 104422 | 12.581 |
[Fig. 6]
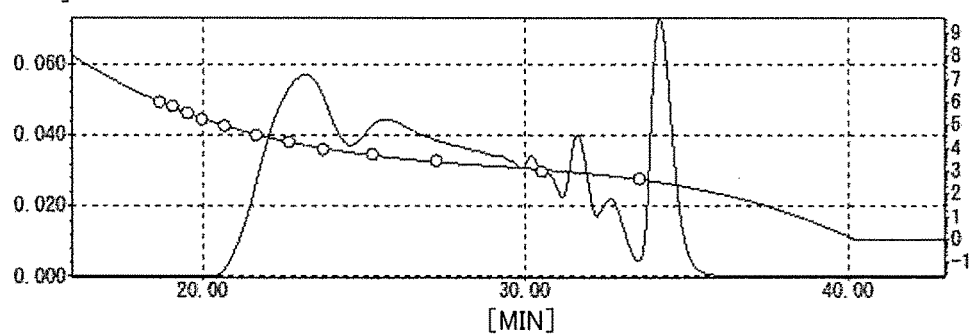

US 10,047,190 B2

EPOXY RESIN, METHOD FOR PRODUCING EPOXY RESIN, CURABLE RESIN COMPOSITION, CURED PRODUCT, FIBER REINFORCED COMPOSITE MATERIAL, AND MOLDED ARTICLE

CROSS REFERENCE

This application is the U.S. National Phase under 35 U.S.C. § 371 of International Application No. PCT/JP2015/074204, filed on Aug. 27, 2015, which claims the benefit of Japanese Application No. 2014-179064, filed on Sep. 3, 2014, the entire contents of each are hereby incorporated by reference.

TECHNICAL FIELD

The present invention relates to a curable resin composition exhibiting excellent heat resistance and toughness in terms of a cured product thereof, a cured product thereof, a fiber reinforced composite material, and a molded article.

BACKGROUND ART

Reinforcing fiber composite materials have attracted attentions since it is light and has characteristics of excellent heat resistance and mechanical strength, and thus, they have been more widely used in applications of various structures such as casings or various members of automobiles and aircrafts. Matrix resins for the fiber reinforced composite materials are required to have various types of performance, such as superior impregnation into reinforcing fibers, excellent storage stability, no generation of voids or the like even with high curability, and excellent heat resistance, mechanical strength, and fracture toughness in terms of the cured product. There has been a demand for development of a resin material having a good balance among these various types of performance.

As an epoxy resin having high curability and exhibiting excellent heat resistance in terms of a cured product thereof, bisphenol A novolac type epoxy resins have been known. In particular, among the bisphenol A novolac type epoxy resins, those capable of improving the heat resistance for a cured product by attaining higher molecular weights of the resins have been proposed (see, for example, PTL 1).

On the other hand, a bisphenol A novolac type epoxy resin having a higher molecular weight easily generates 3-dimensional bridges within the molecular structure, and has a reduced reactivity of an epoxy group, and as a result, the change in heat resistance after the thermal history in cured products thereof easily occurs, and in addition, the thermal linear expansion properties are also deteriorated. In view of these, through the modification of the resins, a curable resin composition formed by using a polyglycidyl ether of bisphenol novolac having a ratio of the bindings of the 2-, 4-, and 6-positions in a phenol nucleus set to a specific range has been proposed (see, for example, PTL 2).

However, such a curable composition has excellent curability, while the number of epoxy groups decreases in an intramolecular reaction, and as a result, a cured product thereof has insufficient mechanical strength, and thus, has low toughness, so-called fracture toughness.

CITATION LIST

Patent Literature

[PTL 1] JP-A-64-90215
[PTL 2] JP-A-2013-87212

SUMMARY OF INVENTION

Technical Problem

Accordingly, the present invention has an object to provide a curable resin composition exhibiting excellent heat resistance and toughness in terms of a cured product thereof, a cured product thereof, an epoxy resin capable of providing the same, a production method therefor, a fiber reinforced composite material, and a molded article.

Solution to Problem

The present inventors have conducted extensive studies in order to achieve the above objects, and as a result, they have found that the objects can be achieved by using an epoxy resin in which the phenol novolac resin contains bisphenol F and the ratio of conjugates which are present, relative to the bisphenol F, is set to a specific range as an epoxy resin obtained by the polyglycidyl-etherification of a phenol novolac resin, thereby completing the present invention.

That is, the present invention provides an epoxy resin obtained by the polyglycidyl-etherification of a phenol novolac resin, in which the phenol novolac resin contains at least one bisphenol F represented by any one of the following Structural Formulae (1-1) to (1-3) as a bisphenol F component:

[Chem. 1]

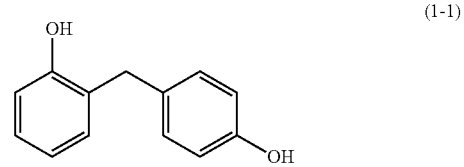
(1-1)

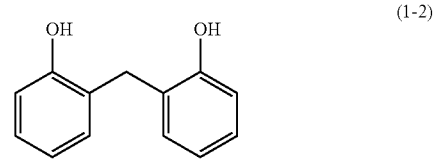
(1-2)

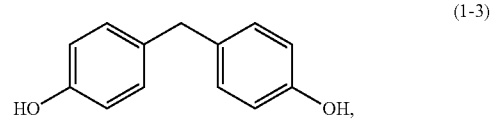
(1-3)

with the content of the [o, p'] conjugate (x1) represented by Structural Formula (1-1) in the bisphenol F component being in a range of 30% to 45% relative to the total of the [o, p'] conjugate (x1) the [o, o'] conjugate (x2)+the [p, p'] conjugate (x3) in terms of the area ratio according to a liquid chromatography measurement.

In addition, the present invention provides a method for producing the epoxy resin, a curable resin composition containing the same, a cured product thereof, a fiber reinforced composite material containing the epoxy resin, a curing agent and a reinforcing fiber, and a molded article formed by curing the same.

Advantageous Effects of Invention

According to the present invention, it is possible to provide a curable resin composition capable of exhibiting excellent heat resistance and toughness in terms of a cured product thereof, in which these physical properties are not deteriorated even in a case of being exposed to humidity and heat conditions, a cured product thereof, a fiber reinforced composite material, and a molded article.

BRIEF DESCRIPTION OF DRAWINGS

FIG. 1 is a GPC chart of the phenol novolac resin (2) obtained in Example 1.
FIG. 2 is an HPLC chart of the phenol novolac resin (2) obtained in Example 1.
FIG. 3 is a GPC chart of the epoxy resin (1) obtained in Example 1.
FIG. 4 is a GPC chart of the phenol novolac resin (4) obtained in Example 2.
FIG. 5 is an HPLC chart of the phenol novolac resin (4) obtained in Example 2.
FIG. 6 is a GPC chart of the epoxy resin (2) obtained in Example 2.

DESCRIPTION OF EMBODIMENTS

In the following, the present invention is described in detail.

The epoxy resin of the present invention is an epoxy resin formed by the polyglycidyl-etherification of a phenol novolac resin. The phenol novolac resin is obtained by a condensation reaction of phenols and formaldehydes, and is usually formed of a mixture containing a plurality of the phenol novolac resins having different numbers of phenol nuclei within one molecule or different binding sites thereof.

In the present invention, as a result of the investigation on an epoxy resin for use in a curable resin composition in which the heat resistance and the toughness of the obtained cured product are excellent, and these physical properties when being exposed to humidity and heat conditions are less deteriorated, it was found that in a mixture of phenol novolac resins that are precursors of epoxy resins, the presence of binuclear bodies and the difference in the binding sites in the binuclear bodies have great effects on the physical properties of the obtained cured product.

That is, the phenol novolac resin which is a precursor of the epoxy resin of the present invention contains at least one bisphenol F represented by any one of the following Structural Formulae (1-1) to (1-3) as a bisphenol F component.

[Chem. 2]

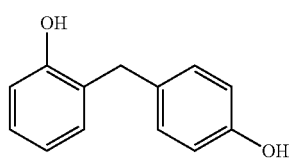

(1-1)

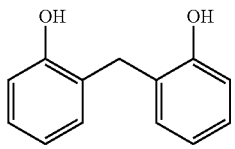

(1-2)

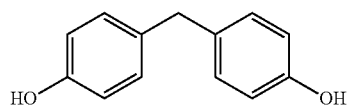

(1-3)

It is essential that the content of the [o, p'] conjugate (x1) represented by Structural Formula (1-1) in the bisphenol F component is in a range of 30% to 45% relative to the total of the [o, p'] conjugate (x1)+the [o, o'] conjugate (x2)+the [p, p'] conjugate (x3) in terms of the area ratio according to a liquid chromatography measurement.

The use of such an epoxy resin provides a cured product being excellent in both of the heat resistance and the toughness. Further, even in a case of being exposed to humidity and heat conditions, the heat resistance and the toughness of the cured product are less deteriorated, and thus, these physical properties can be maintained at a high level.

The phenol novolac resins that are synthesized at a time from phenols and formaldehydes according to various methods also include the [o, p'] conjugate (x1) represented by Structural Formula (1-1), the [o, o'] conjugate (x2) represented by Structural Formula (1-2), and the [p, p'] conjugate (x3) represented by Structural Formula (1-3). However, from the investigation conducted by the present inventors, it could be found that the content of the [o, p'] conjugate (x1) represented by Structural Formula (1-1) in those obtained by those production methods in the related art has an area ratio of 50% or more, relative to the total of the [o, p'] conjugate (x1)+the [o, o'] conjugate (x2)+the [p, p'] conjugate (x3) according to a liquid chromatography measurement. In a case of the related art where the content of the [o, p'] conjugate (x1) is in a range of 50% or more, in preparing an epoxy resin by the glycidyl-etherification of the resin, a combination of the resin with a curing agent in a cured product thereof and a curing condition are selected to enhance the heat resistance•elastic modulus, the toughness tends to be deteriorated. On the other hand, when the selection is performed to enhance the toughness, the heat resistance•elastic modulus tends to be deteriorated.

In the phenol nucleus, the 2-, 4-, and 6-positions can be usually reactive sites with formaldehyde, but it could be seen that if the content of the [o, p'] conjugate (x1) represented by Structural Formula (1-1) is in a range of 30% to 45% relative to the total of the [o, p'] conjugate (x1)+the [o, o'] conjugate (x2)+the [p, p'] conjugate (x3) in terms of its area ratio according to a liquid chromatography measurement, a cured product which is obtained by using an epoxy resin formed by the glycidyl-etherification of the resin can satisfy all of high heat resistance, high elastic modulus, and high toughness at the same time.

The reason why the physical properties are all exhibited at the same time is not clear, but a relatively linear-dominant crosslinked structure which is derived from the [p, p'] conjugate (x3) is effective for imparting the toughness, and the [o, o'] conjugate (x2) is presumed to be effective for high heat resistance and high elastic modulus.

Furthermore, the content of each component in the binuclear body (X) in the present invention is a value calculated from the area ratio of a liquid chromatography (HPLC) chart diagram measured under the following conditions.

"Agilent 1220 Infinity LC" manufactured by Tosoh Corporation

Column: "TSK-GEL ODS-120T" manufactured by Tosoh Corporation

Detector: VWD

Data treatment: "Agilent EZChrom Elite" manufactured by Tosoh Corporation

Measurement conditions:

| | |
|---|---|
| Column temperature | 40° C. |
| Developing solvent | |
| Liquid A: water/acetonitrile = $50/50$% by weight | |
| Liquid B: acetonitrile | |
| Liquid A/Liquid B = $95/5$ × 15 min | |
| → Linear gradient (20 min) | |
| → $0/100$ × 20 min | |
| Flow rate | 1.0 ml/min |
| Measurement wavelength | 254 nm |

Particularly, from the viewpoints that the above performance in a cured product can be exhibited at higher levels, and that the impregnation into reinforcing fibers at a time of producing a composite material containing reinforcing fibers which are described later is improved, it is more preferable that the content of the bisphenol F components in the phenol novolac resin is in a range of 10% to 60% in terms of the area ratio according to a GPC measurement, and above all, it is still more preferable that in the bisphenol F components, the content of the [o, p'] conjugate (x1) represented by Structural Formula (1-1) is in a range of 30% to 45% and the content of the [o, o'] conjugate (x2) represented by Structural Formula (1-2) is in a range of 15% to 50%, in terms of their area ratios according to a liquid chromatography measurement.

The binuclear body (bisphenol F) in the epoxy resin of the present invention is a value calculated from the area ratio in the chart diagram of GPC measured under the following conditions.

Measurement device: "HLC-8220 GPC" manufactured by Tosoh Corporation

Columns: Guard column "HXL-L" manufactured by Tosoh Corporation

"TSK-GEL G2000HXL" manufactured by Tosoh Corporation

"TSK-GEL G2000HXL" manufactured by Tosoh Corporation

"TSK-GEL G3000HXL" manufactured by Tosoh Corporation

"TSK-GEL G4000HXL" manufactured by Tosoh Corporation

Detector: Differential Refractive Index (RI)

Data processing: "GPC-8020 Model II Ver. 4.10" manufactured by Tosoh Corporation Measurement conditions: Column temperature 40° C.

Developing solvent: Tetrahydrofuran

Flow rate: 1.0 ml/min

Standard: The following monodisperse polystyrene having a known molecular weight was used in accordance with the measurement manual of the "GPC-8020 model II version 4.10".

(Polystyrenes Used)

"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation Sample: Microfiltered solution in tetrahydrofuran at 1.0% by mass on a resin solid basis (50 µl).

The epoxy resin of the present invention can be obtained by, for example, a method which includes causing phenols to react with formaldehydes at a ratio in a range of phenols:formaldehydes=35:1 to 25:1 (molar ratio) by an acid catalyst, performing the reaction under a condition for distilling excess phenols to obtain bisphenol F (A), 90% or more of which is a body with n=0, causing the obtained bisphenol F (A) to react with formaldehydes under a condition of bisphenol F (A):formaldehydes=1:0.20 to 1:0.65 (molar ratio) to obtain a phenol novolac resin, and causing the phenol novolac resin to react with epihalohydrin.

Alternatively, the epoxy resin can also be obtained by a method which includes causing phenols to react with formaldehydes at a ratio in a range of phenols:formaldehydes=35:1 to 25:1 (molar ratio) by an acid catalyst present in a range of 0.1% to 3.0%, performing the reaction under a condition for distilling excess phenols, further performing distillation by thin-film molecular distillation to obtain bisphenol F (B), 99% or more of which is a body with n=0, causing the obtained bisphenol F (B) to react with formaldehydes under a condition of bisphenol F (B):formaldehydes=1:0.20 to 1:0.65 (molar ratio) to obtain a phenol novolac resin, and causing the phenol novolac resin to react with epihalohydrin.

Examples of the formaldehydes include formaldehyde, paraformaldehyde, and glyoxal. These may be used alone or in combination of two or more kinds thereof. Among these, formaldehyde is preferable since it is economically advantageous.

Examples of the acid catalyst include inorganic acids such as hydrochloric acid, sulfuric acid, and phosphoric acid; organic acids such as methanesulfonic acid, p-toluenesulfonic acid, and oxalic acid; and Lewis acids such as boron trifluoride, anhydrous aluminum chloride, and zinc chloride. Oxalic acid is preferably used since acid components do not remain after the reaction.

The ratio of the acid catalyst to be used is not particularly limited, but from the viewpoints of reaction efficiency, production cost, and the like, the acid catalyst is preferably used in an amount in a range of 0.1% to 3.0% by mass with respect to all the starting materials.

The reaction temperature is not particularly limited, but from the viewpoint of reaction efficiency, the reaction is preferably carried out under a temperature condition of 80° C. to 150° C.

According to the above-mentioned method, a phenol novolac resin containing a relatively large amount of bisphenol F (binuclear body) can be easily obtained, and in particular, a content of the [o, p'] conjugate (x1) represented by Structural Formula (1-1) as defined in the present invention can be obtained in a range of 30% to 45%. However, in order to adjust a content of various conjugates of a binuclear body, various conjugates of commercially available bisphenol F are mixed with the obtained phenol novolac resin, and the mixture is used.

As described above, each of the contents of the bisphenol F (binuclear body) and the binuclear body having different binding sites in the phenol novolac resin is measured, and if necessary, other bisphenol F or phenol novolac resins that are commercially available are used and their contents are defined in the present application or adjusted to preferred ranges. Then, they can be used as a precursor to carry out a glycidyl-etherification reaction, thereby obtaining the epoxy resin of the present invention.

As the glycidyl-etherification step, specifically, a method in which 2 to 10 moles of epihalohydrin are added to 1 mole of a hydroxyl group in the phenol novolac resin which is a precursor, and the mixture is reacted at a temperature of 20° C. to 120° C. for 0.5 to 10 hours while 0.9 to 2.0 moles of a basic catalyst are simultaneously or gradually added to 1 mole of a hydroxyl group in the phenol novolac resin can be exemplified.

Examples of the epihalohydrin for use herein include epichlorohydrin, epibromohydrin, and β-methylepichlorohydrin. These may be each used alone or in combination of two or more kinds thereof. Among these, epichlorohydrin is preferable due to its industrial availability. Further, when industrial production is carried out, the epihalohydrin used for introduction of the first batch in the production of an epoxy resin is all fresh, whereas the epihalohydrin used for the subsequent batches is preferably a combination of epihalohydrin recovered from a crude reaction product generated in the production process and fresh epihalohydrin in an amount equivalent to the consumption during the reaction.

Moreover, specific examples of the basic catalyst include alkaline earth metal hydroxides, alkali metal carbonates, and alkali metal hydroxides. In particular, alkali metal hydroxides are preferable due to their high catalytic activity in a reaction for synthesizing an epoxy resin, and examples of the alkali metal hydroxide include sodium hydroxide and potassium hydroxide. During the use, these basic catalysts may be used in the form of an aqueous solution containing about 10% to 55% by mass of the basic catalyst or may be used in the form of a solid. In a case of using a form of an aqueous solution, a method in which the basic catalyst is continuously added to the reaction system while water and epihalohydrin are continuously distilled off from the reaction mixture under a reduced or normal pressure condition, and further, liquid separation is performed, water is removed, whereas the epihalohydrin may be continuously returned to the reaction mixture is also available.

Moreover, the reaction of the phenol resin intermediate and epihalohydrin has an increased reaction rate when being carried out in an organic solvent, whereby a desired epoxy resin can be produced efficiently. Examples of the organic solvent for use herein include, but are not limited to, ketones such as acetone and methyl ethyl ketone; alcohol compounds such as methanol, ethanol, 1-propyl alcohol, isopropyl alcohol, 1-butanol, secondary butanol, and tertiary butanol; cellosolves such as methyl cellosolve and ethyl cellosolve; ether compounds such as tetrahydrofuran, 1,4-dioxane, 1,3-dioxane, and diethoxyethane; and aprotic polar solvents such as acetonitrile, dimethyl sulfoxide, and dimethyl formamide. These organic solvent may be each used alone or may be used in combination of two or more kinds thereof so as to adjust polarity.

After completion of the reaction, the reaction product is washed with water, and then the unreacted epihalohydrin and the organic solvent used in combination are distilled off by distillation with heating under reduced pressure. To obtain an epoxy resin containing a reduced amount of a hydrolyzable halogen, the resulting epoxy resin is dissolved again in an organic solvent such as toluene, methyl isobutyl ketone, and methyl ethyl ketone and an aqueous solution of an alkali metal hydroxide such as sodium hydroxide and potassium hydroxide is added and then the reaction can be further conducted. In this case, a phase transfer catalyst such as a quaternary ammonium salt and a crown ether may be present for the purpose of increasing the reaction rate. In a case of using the phase transfer catalyst, the amount thereof to be used is preferably a ratio of 0.1 to 3.0 parts by mass with respect to 100 parts by mass of the epoxy resin to be used. After completion of the reaction, a desired epoxy resin can be obtained by removing the produced salt by filtration, washing with water, or the like, and distilling the organic solvent off with heating under reduced pressure.

The epoxy resin for use in the present invention preferably has a melt viscosity at 150° C. in a range of 1 to 100 mPa·s due to its excellent impregnation into reinforcing fibers.

In the present invention, by using a specific epoxy resin, those known as a curing agent for an epoxy resin in the related art are appropriately selected and combined to produce a curable resin composition, which can be appropriately subjected to a curing reaction to obtain a cured product.

As the curing agent which can be used herein, curing agents such as an amine-based compound, an amide-based compound, an acid anhydride-based compound, or the like can be used. Specifically, examples of the amine-based compound include diaminodiphenylmethane, diaminodiphenyl ether, diethylene triamine, triethylene tetramine, diaminodiphenylsulfone, isophorone diamine, and a guanidine derivative. Examples of the amide-based compound include dicyandiamide, and a polyamide resin synthesized from a linolenic acid dimer and ethylenediamine. Examples of the acid anhydride-based compound include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride.

Among these, the dicyandiamide compound is preferably used in views of suitable viscosity of the curable resin composition, excellent impregnation into reinforcing fibers which are described later, excellent storage stability in the form of a prepreg, and inhibited generation of voids during curing.

The dicyandiamide compound is a compound obtained by the modification of dicyandiamide, or a functional group in dicyandiamide, that is, an amino group, an imino group, or a cyano group, and examples thereof include o-tolyl biguanide and diphenyl biguanide. These may be each used alone or in combination of two or more kinds thereof.

In addition, the curable resin composition of the present invention may further appropriately contain a curing accelerator. Examples of the curing accelerator include imidazole compounds such as 1-methylimidazole, 2-methylimidazole, 1,2-dimethylimidazole, 2-ethyl-4-methylimidazole, 2-ethyl-2-phenylimidazole, and 1-cyanoethyl-2-ethyl-4-methylimidazole; and urea derivatives such as N,N-dimethyl-N'-(3-chloro-4-methylphenyl)urea, N,N-dimethyl-N'-(4-chlorophenyl)urea, N,N-dimethyl-N'-(3,4-dichlorophenyl)urea, N,N-dimethyl-N'-(3,4-dichloromethylphenyl)urea, 2,4-(N',N'-dimethylureido)toluene, and 1,4-bis(N',N'-dimethylureido)benzene. These may be each used alone or in combination of two or more kinds thereof. Further, these addition amounts are preferably in a range of 0.01 to 3 parts by mass with respect to 100 parts by mass of the curable resin composition.

The curable resin composition of the present invention may also use epoxy resins other than the epoxy resin described above in detail as an epoxy resin component. Specifically, such other epoxy resins may also be used in combination, within a range such that the above-mentioned epoxy resins are at 30% by mass or more, and preferably at 40% by mass or more, with respect to the total mass of the epoxy resin components.

As such other epoxy resins, various epoxy resins can be used, and examples thereof include bisphenol type epoxy resins such as a bisphenol A type epoxy resin and a bisphenol F type epoxy resin; biphenyl type epoxy resins such as a biphenyl type epoxy resin and tetramethylbiphenyl type epoxy resin; novolac type epoxy resins such as a phenol novolac type epoxy resin, a cresol novolac type epoxy resin, a naphthol novolac type epoxy resin, a naphthol-phenol co-condensed novolac type epoxy resin, a bisphenol A novolac type epoxy resin, and a biphenyl novolac type epoxy resin; aralkyl type epoxy resins such as a phenolaralkyl type epoxy resin and a naphtholaralkyl type epoxy resin; a tetraphenylethane type epoxy resin, a dicyclopentadiene-phenol adduct reaction type epoxy resin, and an aromatic hydrocarbon formaldehyde resin-modified phenol resin type epoxy resin. These may be each used alone or in combination of two or more kinds thereof. Among these, a bisphenol type epoxy resin is preferable in a view that a cured product having excellent toughness is obtained.

For the blend ratio of the epoxy resin component to the curing agent in the curable resin composition of the present invention, the number of moles of active hydrogen in the curing agent is preferably 0.6 to 1.0 equivalent with respect to a total of 1 equivalent of epoxy groups in the epoxy resin component, in a view that a cured product having excellent curability, and excellent heat resistance and toughness is obtained.

Furthermore, the curable resin composition of the present invention may also contain various additives such as a flame retardant, if necessary.

Examples of the flame retardant include inorganic phosphorus compounds including red phosphorus, ammonium phosphates such as monoammonium phosphate, diammonium phosphate, triammonium phosphate, and ammonium polyphosphate, and phosphoramides; organic phosphorus compounds such as phosphoric ester compounds, phosphonic acid compounds, phosphinic acid compounds, phosphine oxide compounds, phosphorane compounds, organic nitrogen-containing phosphorus compounds, cyclic organophosphorus compounds such as 9,10-dihydro-9-oxa-10-phosphaphenanthrene-10-oxide, 10-(2,5-dihydroxyphenyl)-10H-9-oxa-10-phosphaphenanthrene-10-oxide, and 10-(2,7-dihydroxynaphthyl)-10H-9-oxa-10-phosphaphenanthrene-10-oxide, and derivatives obtained by reacting those with compounds such as epoxy resins and phenolic resins; nitrogen-based flame retardants such as a triazine compound, a cyanuric acid compound, an isocyanuric acid compound, and phenothiazine; silicone-based flame retardants such as silicone oil, silicone rubber, and a silicone resin; and inorganic flame retardants such as metal hydroxides, metal oxides, metal carbonate compounds, metal powders, boron compounds, and low-melting-point glass. In a case of using these flame retardants, the amount is preferably in a range of 0.1% to 20% by mass in the curable resin composition.

The curable composition of the present invention has excellent flowability, and can be used in various applications due to its features of excellent heat resistance and toughness for a cured product. Specifically, examples thereof include fiber reinforced resin molded articles of CFRP or the like, typified by casings or various members of automobiles and aircrafts, resin materials for use in electronic circuit substrates or the like, such as a laminate plate for a printed circuit board, an interlayer insulating material for a build-up board, an adhesive film for build-up, a semiconductor sealing material, a die attach agent, an underfill material for mounting a flip chip, a glob top material, a liquid sealing material for TCP, an electrically conductive adhesive, a liquid crystal sealing agent, a coverlay for a flexible substrate, and a resist ink; optical materials such as an optical waveguide and an optical film, resin casting materials, adhesives, and coating materials such as insulating dyes; and various photosemiconductor devices such as LED, phototransistors, photodiodes, photocouplers, CCD, EPROM, photosensors, and in particular, the curable composition can be suitably used in applications of fiber reinforced resin molded articles of CFRP or the like, typified by casings or various members of automobiles and aircrafts.

In a case where the curable resin composition of the present invention is used in applications in which the curable resin composition is usually used after being diluted in an organic solvent, such as laminate plates and films, and if necessary, an organic solvent may be appropriately blended. Examples of the organic solvent for use herein include acetone, methyl ethyl ketone, and ethyl acetate, and among these, those having a boiling point of 100° C. or lower are preferably used. The amounts of these organic solvents to be used depend on the desired applications, or the like, but the amount of the organic solvent in the curable resin composition is preferably 60% by mass or less.

In a case where the curable resin composition of the present invention is used for a fiber reinforced composite material, it is preferable that an organic solvent is not substantially used, and in a case of using the organic solvent, it is preferable that the amount of the organic solvent in the fiber reinforced composite material is 5% by mass or less. Examples of the organic solvent for use herein include acetone, methyl ethyl ketone, and ethyl acetate, and among these, those having a boiling point of 100° C. or lower is preferably used.

The reinforcing fiber which is used in the fiber reinforced composite material of the present invention may be any one of a twist yarn, an untwisted yarn, and a zero-twist yarn, but the untwisted yarn and the zero-twist yarn are preferable since both of the moldability and the mechanical strength of a fiber reinforced plastic member are satisfied. Further, as a form of the reinforcing fiber, fibers aligned in one direction or a fabric can be used. The fabric can be freely selected from a plain fabric, a satin fabric, and the like according to the sites and purposes of use. Specific examples of the materials thereof include carbon fibers, glass fibers, aramid fibers, boron fibers, alumina fibers, and silicon carbide fibers in views of excellent mechanical strength and durability. These may be used alone or in combination of two or more kinds thereof. Among these, the carbon fibers are preferable, particularly from the viewpoint of good strength of a molded article. As the carbon fiber, various carbon fibers such as polyacrylonitrile-based, pitch-based, and rayon-based carbon fibers can be used. Among these, the polyacrylonitrile-based carbon fibers are preferable since high-strength carbon fibers are easily obtained.

In a view that a molded product having excellent fracture toughness and mechanical strength is obtained, the content of the reinforcing fibers in the fiber reinforced composite material of the present invention is preferably an amount such that the volume content is in a range of 40% to 85%.

Examples of a method for producing a fiber reinforced resin molded article using the fiber reinforced composite material of the present invention include a hand lay-up method or spray-up method including spreading a fiber aggregate in a mold and then laminating the varnish in multiple layers; a vacuum impregnation method in which a base material composed of reinforcing fibers is stacked while being impregnated with the curable composition using one of male and female molds to form a molded product, and the molded product is covered with a flexible mold capable of applying pressure to the molded product, airtight-sealed, and then vacuum (reduced-pressure)-molded; a SMC press method in which the fiber reinforced composite material containing reinforcing fibers is formed into a sheet and then compression-molded with a mold; a RTM method including injecting the curable composition into a combined mold having a fiber bed; and a method including producing a prepreg by impregnating reinforcing fibers with the curable composition and then baking the prepreg in a large autoclave.

Examples of application of the fiber reinforced resin molded article thus obtained include sporting goods such as a fish pole, a golf shaft, and a bicycle frame; frames or body materials of automobiles and aircrafts; spacecraft members; and a wind-power generation blade. In particular, an automobile member, an aircraft member, and a spacecraft member are required to have high fracture toughness and mechanical strength, and thus the fiber reinforced resin molded article of the present invention is suitable for these applications.

EXAMPLES

Next, the present invention will be specifically described below with reference to Examples and Comparative Examples, and "part(s)" and "%" below are on a mass basis unless otherwise specified.

The content of each components of the trinuclear body (X) in Examples of the present invention was calculated from the area ratio in the liquid chromatography (HPLC) chart diagram measured under the following conditions.

"Agilent 1220 Infinity LC" manufactured by Tosoh Corporation
Column: "TSK-GEL ODS-120T" manufactured by Tosoh Corporation
Detector: VWD
Data processing: "Agilent EZChrom Elite" manufactured by Tosoh Corporation
Measurement condition:

| | |
|---|---|
| Column temperature | 40° C. |
| Developing solvent | |
| Liquid A: Water/acetonitrile = $^{50}/_{50}$% by weight | |
| Liquid B: Acetonitrile | |
| Liquid A/Liquid B = $^{95}/_{5}$ × 15 min | |
| → Linear gradient (20 min) | |
| → $^{0}/_{100}$ × 20 min | |
| Flow rate | 1.0 ml/min |
| Measurement wavelength | 254 nm |

The content of the trinuclear body (X) in the epoxy resin is calculated from the area ratio in the chart diagram of GPC measured under the following conditions.

Measurement device: "HLC-8220 GPC" manufactured by Tosoh Corporation
Columns:
Guard column "HXL-L" manufactured by Tosoh Corporation
"TSK-GEL G2000HXL" manufactured by Tosoh Corporation
"TSK-GEL G2000HXL" manufactured by Tosoh Corporation
"TSK-GEL G3000HXL" manufactured by Tosoh Corporation
"TSK-GEL G4000HXL" manufactured by Tosoh Corporation
Detector: Differential Refractive Index (RI)
Data processing: "GPC-8020 Model II Ver. 4.10" manufactured by Tosoh Corporation
Measurement conditions:

| | |
|---|---|
| Column temperature | 40° C. |
| Developing solvent | Tetrahydrofuran |
| Flow rate | 1.0 ml/min |

Standard: The following monodisperse polystyrene having a known molecular weight was used in accordance with the measurement manual of the "GPC-8020 model II version 4.10".

(Polystyrenes Used)
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation
Sample: Microfiltered solution in tetrahydrofuran at 1.0% by mass on a resin solid basis (50 µl).

The melt viscosity of the epoxy resin was measured using an ICI viscometer in accordance with ASTM D4287.

The softening point of the epoxy resin was measured in accordance with JIS K7234.

Example 1

In a flask equipped with a thermometer, an dropping funnel, a cooling tube, a fractionating column, a nitrogen gas inlet tube, and a stirrer, 2820 g (30.00 moles) of phenol and 1.4 g (0.0156 moles) of oxalic acid were introduced, and the mixture was stirred under nitrogen purging and warmed to 80° C. Thereafter, 71.4 g (1.00 moles) of a 42% aqueous formaldehyde solution was added dropwise thereto for 60 minutes, and then the mixture was stirred under warming to 100° C. for 30 minutes. After reaching 100° C., the reaction was performed for 3 hours. Subsequently, the mixture was warmed to 170° C. for 2 hours, water vapors were charged thereinto with heating under reduced pressure, and excess phenol was removed to obtain 197 parts of a phenol novolac resin (1) having bisphenol F (a body with n=0) as a main component. The obtained bisphenol F (1) had equivalents of hydroxyl groups of 100 g/equivalent, a content of the binuclear bodies of 91% (GPC), and an isomer ratio of the binuclear bodies of [o, p'] conjugate (x1): 51%, [o, o']

conjugate (x2): 20%, and [p, p'] conjugate (x3): 29% in terms of % by area according to a liquid chromatography measurement.

In a flask equipped with a thermometer, an dropping funnel, a cooling tube, a fractionating column, a nitrogen gas inlet tube, and a stirrer, 100 g (1.00 equivalent) of the phenol novolac resin (1) obtained above, 30 g of water, and 0.3 g (0.0033 moles) of oxalic acid were introduced, and the mixture was warmed to 100° C. Thereafter, 22.1 g (0.31 moles) of 42% formaldehyde was added dropwise thereto for 60 minutes, and then the mixture was stirred at 100° C. for 3 hours to perform a reaction. Then, while the condensed water generated by the reaction was distilled off using the fractionating column, the residue was warmed to 180° C. for 3 hours, and water vapors were charged thereinto with heating under reduced pressure to obtain 98 g of a phenol novolac resin (2) (a yield of 95%). The obtained phenol novolac resin (2) had equivalents of hydroxyl groups of 105 g/equivalent, a content of the binuclear bodies of 14% (GPC), and an isomer ratio of the binuclear bodies of [o, p'] conjugate (x1): 38%, [o, o'] conjugate (x2): 26%, and [p, p'] conjugate (x3): 36% (HPLC).

In a flask equipped with a thermometer, an dropping funnel, a cooling tube, a nitrogen gas inlet tube, and a stirrer, 210 g (hydroxyl groups: 2.00 equivalents) of the phenol novolac resin (2) obtained above, 740 g (8.00 moles) of epichlorohydrin, and 220 g of n-butanol were introduced, and the mixture was warmed to 45° C. 420 g (2.10 moles) of a 20% aqueous sodium hydroxide solution was added dropwise thereto for 3 hours, and then the mixture was further stirred for 30 minutes and then left to stand. The physiological saline in the lower layer was removed, and epichlorohydrin was recovered by distillation at 150° C. To the crude resin in the flask, 600 g of MIBK was added, 158 g of water was further added thereto, and the mixture was washed with water at 80° C. After removing the washing water in the lower layer, dehydration, filtration, and removal of the solvent from MIBK at 150° C. were carried out to obtain an epoxy resin (1). The obtained epoxy resin was a yellow solid, and had a softening point of 68° C. and an epoxy equivalent of 186 g/equivalents. The content of the binuclear bodies was 12%, the content of the trinuclear bodies was 5%, and the content of the tetranuclear bodies was 6% (GPC).

Example 2

The phenol novolac resin (1) obtained in the Example was subjected to molecular distillation under the conditions of a temperature of 220° C., a reduced pressure of 0.5 torr, and a feeding amount of 50 g/min, using a thin-film distillation device (heat transfer area: 0.1 m3) to obtain a phenol novolac resin (3). The obtained phenol novolac resin (3) had equivalents of hydroxyl groups of 100 g/equivalent, the content of the binuclear bodies of 99.6% (GPC), and an isomer ratio of the binuclear bodies of [o, p'] conjugate (x1): 50%, [o, o'] conjugate (x2): 20%, and [p, p'] conjugate (x3): 30% in terms of % by area according to a liquid chromatography measurement.

In the same manner as in Example 1 except that the phenol novolac resin (3) obtained above was used instead of the phenol novolac resin (1) in Example 1, a phenol novolac resin (4) was obtained (a yield of 95%). The obtained phenol novolac resin (4) had equivalents of hydroxyl groups of 105 g/equivalent, the content of the binuclear bodies of 14% (GPC), and an isomer ratio of the binuclear bodies of [o, p'] conjugate (x1): 41%, [o, o'] conjugate (x2): 18%, and [p, p'] conjugate (x3): 41% (HPLC).

In the same manner as in Example 1 except that the phenol novolac resin (4) was used instead of the phenol novolac resin (2) in Example 1, an epoxy resin (2) was obtained. The obtained epoxy resin was a yellow solid, and had a softening point of 73° C. and an epoxy equivalent of 188 g/equivalents. The content of the binuclear bodies was 12%, the content of the trinuclear bodies was 4%, and the content of the tetranuclear bodies was 6% (GPC).

Example 3

In a flask equipped with a thermometer, an dropping funnel, a cooling tube, a fractionating column, a nitrogen gas inlet tube, and a stirrer, 100 g (1.00 equivalent) of the phenol novolac resin (1) obtained in Example 2, 30 g of water, and 0.3 g (0.0033 moles) of oxalic acid were introduced, and the mixture was warmed to 100° C. Thereafter, 11.0 g of 42% formaldehyde was added dropwise thereto for 60 minutes, and then the mixture was stirred at 100° C. for 3 hours to perform a reaction. Then, while the condensed water generated by the reaction was distilled off using the fractionating column, the residue was warmed to 180° C. for 3 hours, and water vapors were charged thereinto with heating under reduced pressure to obtain 96 g of a phenol novolac resin (5) (a yield of 95%). The obtained phenol novolac resin (5) had equivalents of hydroxyl groups of 102 g/equivalent, a content of the binuclear bodies of 45% (GPC), and an isomer ratio of the binuclear bodies of [o, p'.] conjugate (x1): 44%, [o, o'] conjugate (x2): 25%, and [p, p'] conjugate (x3): 31% (HPLC).

In the same manner as in Example 1 except that the phenol novolac resin (5) was used instead of the phenol novolac resin (1) in Example 1, an epoxy resin (3) was obtained. The obtained epoxy resin was a yellow liquid, and had a viscosity of 440,000 mPa·s and an epoxy equivalent of 176 g/equivalents. The content of the binuclear bodies was 38%, the content of the trinuclear bodies was 8%, and the content of the tetranuclear bodies was 17% (GPC).

Comparative Example 1

In the same manner as in Example 1, a glycidyl-etherification reaction was performed using the phenol novolac resin (1) obtained in Example 1 to obtain an epoxy resin (1').

Comparative Example 2

A phenol novolac type epoxy resin, EPICLON N-740, was used as it is. The phenol novolac resin which is a precursor for obtaining an epoxy resin had a content of the binuclear bodies of 26% (GPC), and an isomer ratio of the binuclear bodies of [o, p'] conjugate (x1): 58%, [o, o'] conjugate (x2): 12%, and [p, p'] conjugate (x3): 30% (HPLC).

Examples 4 to 6, and Comparative Examples 3 and 4

The curable resin composition was blended in the following manner, and a cured product thereof was subjected to various evaluations. The blend amounts and the results of various evaluation tests are shown in Table 1. Further, the details of the respective components in the table are as follows.

DICY: Dicyandiamide, "JER Cure DICY-7" manufactured by Mitsubishi Chemical Corporation DCMU: N,N-dimethyl-N'-(3,4-dichlorophenyl)urea ("DCMU" manufactured by Hodogaya Chemical Co., Ltd.)

<Production of Curable Resin Composition>

The respective components were blended at a ratio shown in Table 1 below, and uniformly mixed by melt-kneading with a biaxial heat roll to obtain a curable resin composition.

<Evaluation of Heat Resistance>

A cured product was obtained by injecting the curable resin composition into a mold frame in a range of a width of 90 mm, a length of 110 mm, and a height of 2 mm, and performing press-molding at 150° C. for 1 hour. This was cut into a width of 5 mm and a length of 50 mm with a diamond cutter, and measured with respect to a dynamic viscoelastic modulus in double bending under the following conditions, using "DMS6100" manufactured by SII Nanotechnology Inc. A temperature at maximum tan δ was regarded as a glass transition temperature (Tg), and evaluated.

Measurement conditions

Measurement temperature range: Room temperature to 260° C.

Temperature-raising rate: 3° C./min

Frequency: 1 Hz (Sine wave)

Strain amplitude: 10 μm

<Measurement of Flexural Strength and Flexural Elastic Modulus>

A cured product was obtained by injecting the curable resin composition into a mold frame in a range of a width of 90 mm, a length of 110 mm, and a height of 2 mm, and performing press-molding at 150° C. for 1 hour. The flexural strength and the flexural elastic modulus of the cured product were measured in accordance with JIS K6911.

TABLE 1

| | | Example | | | Comparative Example | |
|---|---|---|---|---|---|---|
| | | 4 | 5 | 6 | 3 | 4 |
| Epoxy resin | 1 | 91.9 | | | | |
| | 2 | | 92.0 | | | |
| | 3 | | | 91.4 | | |
| | 1' | | | | 91.8 | |
| | N-740 | | | | | 91.6 |
| DICY | | 8.1 | 8.0 | 8.6 | 8.2 | 8.4 |
| DCMU | | 1.0 | 1.0 | 1.0 | 1.0 | 1.0 |
| DMA Tg | ° C. | 199 | 199 | 189 | 189 | 166 |
| Tensile elastic modulus | MPa | 4,000 | 4,000 | 3,900 | 3,800 | 3,500 |
| Tensile strength | MPa | 55 | 62 | 70 | 50 | 53 |
| Tensile elongation | % | 2.0 | 2.5 | 2.9 | 1.5 | 1.7 |
| Flexural elastic modulus | MPa | 3,700 | 3,700 | 3,700 | 3,600 | 3,600 |
| Flexural strength | MPa | 126 | 130 | 133 | 116 | 136 |
| Flexural deformation | % | 5.2 | 6.2 | 6.8 | 5.3 | 5.9 |

The invention claimed is:

1. An epoxy resin produced by the polyglycidyl-etherification of a phenol novolac resin, wherein the phenol novolac resin contains at least one bisphenol F represented by any one of the following Structural Formulae (1-1) to (1-3) as a bisphenol F component:

[Chem. 1]

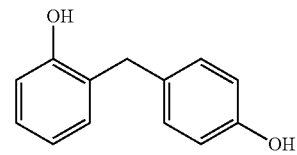

(1-1)

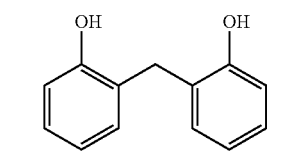

(1-2)

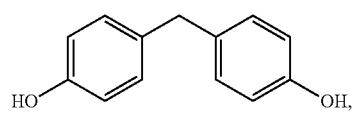

(1-3)

with the content of the [o, p'] conjugate (x1) represented by Structural Formula (1-1) in the bisphenol F component being in a range of 30% to 45% relative to the total of the [o, p'] conjugate (x1)+the [o, o'] conjugate (x2)+the [p, p'] conjugate (x3) in terms of the area ratio according to a liquid chromatography measurement, wherein the content of the bisphenol F component in the phenol novolac resin is from 10% to 60% in terms of the area ratio according to a GPC measurement.

2. The epoxy resin according to claim 1, wherein the content of the [o, p'] conjugate (x1) represented by Structural Formula (1-1) in the bisphenol F component contained in the phenol novolac resin is from 30% to 45% and the content of the [o, o'] conjugate (x2) represented by Structural Formula (1-2) in the bisphenol F component contained in the phenol novolac resin is from 15% to 50% in terms of the area ratios according to a liquid chromatography measurement.

3. The epoxy resin according to claim 1, wherein the content of the trinuclear bodies in the phenol novolac resin is from 0% to 10% in terms of the area ratio according to a GPC measurement.

4. The epoxy resin according to claim 1, which is produced by a method which comprises causing phenols to react with formaldehydes at a ratio of phenols:formaldehydes=35:1 to 25:1 (molar ratio) by an acid catalyst, performing the reaction under a condition for distilling excess phenols to obtain bisphenol F (A), 90% or more of which is a body with n=0, causing the obtained bisphenol F (A) to react with formaldehydes under a condition of bisphenol F (A):formaldehydes=1:0.20 to 1:0.65 (molar ratio) to obtain a phenol novolac resin, and causing the phenol novolac resin to react with epihalohydrin.

5. The epoxy resin according to claim 1, which is produced by a method which comprises causing phenols to react with formaldehydes at a ratio of phenols:formaldehydes=35:1 to 25:1 (molar ratio) by an acid catalyst, performing the reaction under a condition for distilling excess phenols, further performing distillation by thin-film molecular distillation to obtain bisphenol F (B), to obtain bisphenol F (B), 99% or more of which is a body with n=0, causing the obtained bisphenol F (B) to react with formaldehydes under a condition of bisphenol F (B):formaldehydes=1:0.20 to 1:0.65 (molar ratio) to obtain a phenol novolac resin, and causing the phenol novolac resin to react with epihalohydrin.

6. A method for producing an epoxy resin, comprising:
causing phenols to react with formaldehydes at a ratio of phenols:formaldehydes=35:1 to 25:1 (molar ratio) by an acid catalyst, performing the reaction under a condition for distilling excess phenols to obtain bisphenol F (A), 90% or more of which is a body with n=0, causing the obtained bisphenol F (A) to react with formaldehydes under a condition of bisphenol F (A):formaldehydes=1:0.20 to 1:0.65 (molar ratio) to obtain a phenol novolac resin, and causing the phenol novolac resin to react with epihalohydrin.

7. A method for producing an epoxy resin, comprising:
causing phenols to react with formaldehydes at a ratio of phenols:formaldehydes=35:1 to 25:1 (molar ratio) by an acid catalyst present in a range of 0.1% to 3.0%, performing the reaction under a condition for distilling excess phenols, further performing distillation by thin-film molecular distillation to obtain bisphenol F (B), to obtain bisphenol F (B), 99% or more of which is a body with n=0, causing the obtained bisphenol F (B) to react with formaldehydes under a condition of bisphenol F (B):formaldehydes=1:0.20 to 1:0.65 (molar ratio) to obtain a phenol novolac resin, and causing the phenol novolac resin to react with epihalohydrin.

8. A curable resin composition comprising:
the epoxy resin claim 1; and
a curing agent.

9. The curable resin composition according to claim 8, wherein the curing agent is a dicyandiamide compound.

10. A cured product formed by curing the curable resin composition according to claim 8.

11. The curable resin composition according to claim 8, further comprising a reinforcing fiber.

12. A cured product formed by curing the curable resin composition according to claim 11.

13. The epoxy resin according to claim 1, wherein the content of the bisphenol F component in the phenol novolac resin is from 10% to less than 50% in terms of the area ratio according to a GPC measurement.

* * * * *